Jan. 31, 1933. T. W. KOERNER 1,895,576
SHIMMY SHOCK ABSORBER FOR MOTOR VEHICLE STEERING GEARS
Filed Sept. 14, 1931
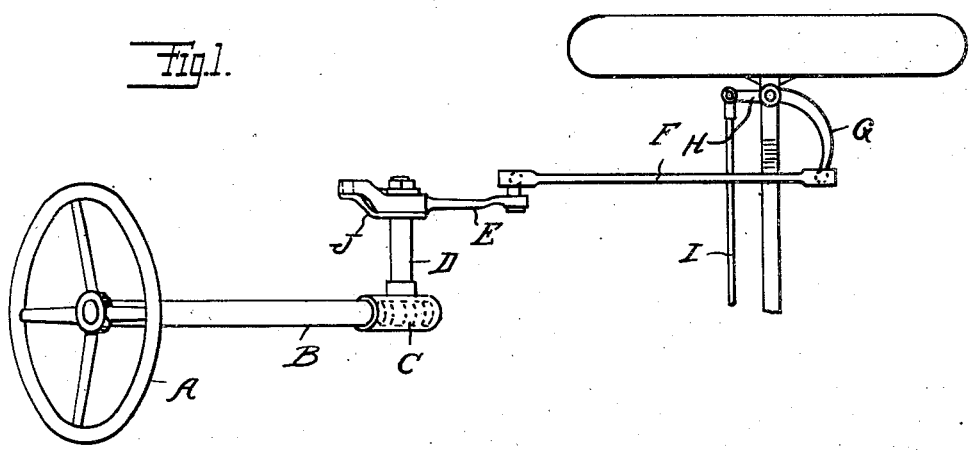
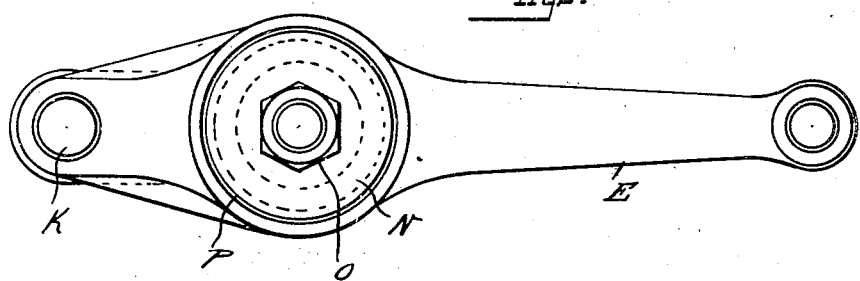
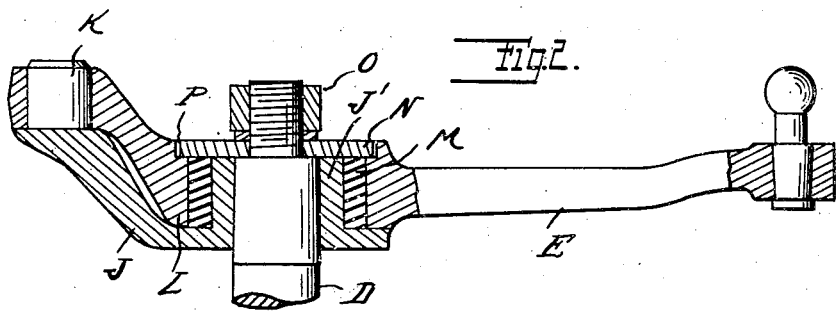
INVENTOR
Theodore W. Koerner
BY Whittemore Hulbert Whittemore
+ Belknap ATTORNEYS Patented Jan. 31, 1933

1,895,576

UNITED STATES PATENT OFFICE

THEODORE W. KOERNER, OF DETROIT, MICHIGAN, ASSIGNOR TO GEMMER MANUFACTURING COMPANY, OF DETROIT, MICHIGAN, A CORPORATION OF MICHIGAN

SHIMMY SHOCK ABSORBER FOR MOTOR VEHICLE STEERING GEARS

Application filed September 14, 1931. Serial No. 562,789.

The invention relates to motor vehicle steering gears and it is the object of the invention to provide means for eliminating or lessening the shock transmitted from the ground wheels to the steering wheel in case of a shimmying action. To this end the invention consists in the construction as hereinafter set forth.

In the drawing:

Figure 1 is a diagrammatic plan view illustrating a steering mechanism for a motor vehicle to which my improvement is applied;

Figure 2 is a longitudinal section through the shock absorbing device;

Figure 3 is a bottom plan view thereof.

In the present state of the art, motor vehicle steering gears usually include the hand wheel A, a rotating steering stem B, a worm gearing C between the steering stem and a rock shaft D, a rock arm E on the rock shaft and a drag link F for coupling said rock arm with a bell crank arm G on one of the axle spindles. This spindle is also connected by the rock arm H and cross link I with the spindle on the opposite end of the axle. The gearing C between the steering stem B and rock shaft D is usually of a slightly reversible character so as to permit of automatic return of the hand wheel to neutral position. This, however, also permits of the transmission of road shocks from the ground wheels to the steering hand wheel and in case of a shimmy action, this may render it difficult for the driver to control the car.

To lessen the transmission of shimmy oscillations of the hand wheel I have devised a construction of shock absorber which is arranged intermediate said wheel and the mechanism mounted on the axle. This is preferably located between the drag link and the rock shaft D and as specifically shown in Figures 2 and 3, is of the following construction:

The rock shaft D has keyed or otherwise rigidly attached thereto a rock arm J which extends in the opposite direction from the drag link F and which is also provided with a hub portion J'. At the outer end of the rock arm J is a pivot K engaging the end of the rock arm E. This rock arm instead of being directly secured to the shaft D is provided with an annular portion L which surrounds the hub J' but is spaced therefrom. Between this portion L and hub J is inserted an annular cushion M preferably formed of rubber. N is a circular flange secured to the end of the rock shaft D by a clamping nut O which flange is of a diameter somewhat greater than the annular cushion M and bears against the annular portion L to hold the rock arm E from axial displacement. The flange E engages a recess in the annular portion L which is of slightly greater diameter so as to leave a surrounding space P between the peripheral edge of the flange and said annular portion L.

With the construction just described, the rock arm E is positively connected to the rock arm J by the pivot pin K through which any rotary movement of the shaft D is transmitted to said rock arm. Inasmuch however, as the annular cushion M is resiliently yieldable any sudden shock or small amplitude oscillation transmitted from the ground wheels through the drag link F to the arm E will not be carried on to the rock shaft D and steering wheel but will be absorbed by the yielding cushion M. The amount of free movement of the arm E is limited by the space P between the annular portion L and the periphery of the flange N and thus the rock arm E will properly function to rotate the rock shaft D in response to a steering movement of the ground wheels. If on the other hand there should be a shimmy action in the ground wheels the rapid oscillations will to a great extent be absorbed by the cushion M which not only prevents the transmission of shocks to the hand wheel but also may have a modified action on the shimmying parts. Thus the driver will retain full control of the steering mechanism until the vehicle can be stopped or the shimmying action otherwise broken.

What I claim as my invention is:

1. In a steering mechanism the combination with a hand wheel and a mechanism mounted on the axle, of intermediate mechanism including adjacent rockable members normally having a common axis and a cushion connection between said rockable members permitting relative axial displacement for absorbing small amplitude shocks or vibrations.

2. In a steering mechanism, the combination with a hand wheel and a mechanism mounted on the axle, of intermediate mechanism including a rock shaft, a rock arm mounted on said rock shaft and a cushion between said rock arm and said rock shaft permitting relative axial displacement.

3. In a steering mechanism for vehicles, the combination with a hand wheel and mechanism mounted on the axle, of intermediate mechanism including a rock shaft, a rock arm rigidly attached to said shaft, a second rock arm connected to said first rock arm and a cushion in the connection between said rock arms permitting relative axial displacement.

4. In a motor vehicle steering mechanism, the combination with a hand wheel and the rock shaft actuated thereby, of a rock arm rigidly mounted on said rock shaft and provided with a hub portion, a second rock arm pivotally connected to said first mentioned rock arm and having an annular portion surrounding said hub portion and an annular cushion interposed between said annular portion and hub portion.

5. In a motor vehicle steering mechanism, the combination with a hand wheel and the rock shaft actuated thereby, of a rock arm rigidly mounted on said rock shaft and provided with a hub portion, a second rock arm pivotally connected to said first mentioned rock arm and having an annular portion surrounding said hub portion, an annular cushion interposed between said annular portion and hub portion, and means for limiting the independent movement of said rock arms.

6. In a motor vehicle steering mechanism, the combination with a hand wheel and the rock shaft actuated thereby, of a rock arm rigidly mounted on said rock shaft and provided with a hub portion, a second rock arm pivotally attached to said first rock arm and having an annular portion surrounding said hub portion, a resilient annular cushion intermediate said hub portion and annular portion, and a rigid member on said rock shaft with and peripherally spaced from said annular member adapted to limit the independent movement of said members.

In testimony whereof I affix my signature.

THEODORE W. KOERNER.